(12) United States Patent
Paulsen et al.

(10) Patent No.: US 11,476,461 B2
(45) Date of Patent: Oct. 18, 2022

(54) PRECURSORS FOR CATHODE MATERIAL WITH IMPROVED SECONDARY BATTERY PERFORMANCE AND METHOD TO PREPARE THE PRECURSORS

(71) Applicants: Umicore, Brussels (BE); Umicore Korea Ltd., Cheonan (KR)

(72) Inventors: Jens Paulsen, Cheonan (KR); Daniël Nelis, Peer (BE); Jin Hu, Cheonan (KR); Liang Zhu, Cheonan (KR); Eric Robert, Liège (BE)

(73) Assignees: UMICORE, Brussels (BE); UMICORE KOREA, LTD., Chungnam (KR)

( * ) Notice: Subject to any disclaimer, the term of this patent is extended or adjusted under 35 U.S.C. 154(b) by 133 days.

(21) Appl. No.: 16/492,206

(22) PCT Filed: Mar. 14, 2017

(86) PCT No.: PCT/IB2017/051458
§ 371 (c)(1),
(2) Date: Sep. 9, 2019

(87) PCT Pub. No.: WO2018/167533
PCT Pub. Date: Sep. 20, 2018

(65) Prior Publication Data
US 2020/0006769 A1    Jan. 2, 2020

(51) Int. Cl.
*H01M 4/525*    (2010.01)
*C01G 53/00*    (2006.01)
*H01M 4/505*    (2010.01)

(52) U.S. Cl.
CPC .......... *H01M 4/525* (2013.01); *C01G 53/006* (2013.01); *H01M 4/505* (2013.01);
(Continued)

(58) Field of Classification Search
CPC ............ H01M 4/02–525; C01G 53/006; C01P 2002/70–72; C01P 2006/11; C01P 2006/12
See application file for complete search history.

(56) References Cited

U.S. PATENT DOCUMENTS

| | | |
|---|---|---|
| 2006/0105239 A1 | 5/2006 | Paulsen et al. |
| 2006/0121350 A1 | 6/2006 | Kajiya et al. |

(Continued)

FOREIGN PATENT DOCUMENTS

| | | |
|---|---|---|
| JP | 2009179545 A | 8/2009 |
| JP | 2012216547 A | 11/2012 |

(Continued)

OTHER PUBLICATIONS

ISA/KR; International Search Report and Written Opinion for International Patent Application No. PCT/IB2017/051458 dated Dec. 12, 2017, 8 pages.

(Continued)

*Primary Examiner* — Cynthia H Kelly
*Assistant Examiner* — Niara Trant
(74) *Attorney, Agent, or Firm* — NK Patent Law

(57) ABSTRACT

A crystalline precursor compound for manufacturing a lithium transition metal based oxide powder usable as an active positive electrode material in lithium-ion batteries, the precursor having a general formula $M(O)_x(OH)_{2-x-y}(CO_3)_y$, with $0 < x \leq 1$, $0 < y < 0.03$ and $M = Ni_a Mn_b Co_c A_d$. A being a dopant, with $0.30 \leq a < 0.90$, $0.10 \leq b < 0.40$, $0.10 \leq c < 0.40$, $d < 0.05$ and $a+b+c+d=1$, the precursor having a Na content less than 200 ppm, a S content less than 250 ppm, the precursor having a specific surface area with a BET value expressed in $m^2/g$ and a tap density TD expressed in $g/cm^3$, with a ratio $BET/TD > 30.10^4$ $cm^5/g^2$.

15 Claims, 7 Drawing Sheets

(52) U.S. Cl.
CPC ...... *C01P 2002/72* (2013.01); *C01P 2004/03* (2013.01); *C01P 2006/11* (2013.01); *C01P 2006/12* (2013.01); *C01P 2006/82* (2013.01)

(56) References Cited

U.S. PATENT DOCUMENTS

| | | |
|---|---|---|
| 2009/0197173 A1 | 8/2009 | Nakaoka |
| 2009/0302267 A1 | 12/2009 | Albrecht et al. |
| 2013/0032753 A1 | 2/2013 | Yamamoto et al. |
| 2016/0218361 A1 | 7/2016 | De Palma et al. |
| 2017/0110726 A1 | 4/2017 | Aida et al. |
| 2019/0341610 A1 | 11/2019 | Aida et al. |

FOREIGN PATENT DOCUMENTS

| | | | |
|---|---|---|---|
| JP | 2012216548 A | 11/2012 | |
| JP | 2012216549 A | 11/2012 | |
| JP | 2015162322 A | 9/2015 | |
| JP | 2015191844 A | 11/2015 | |
| JP | 2016533018 A | 10/2016 | |
| KR | 1020160138048 A | 12/2016 | |
| WO | 2004064180 A1 | 7/2004 | |
| WO | 2016055910 A1 | 4/2016 | |
| WO | 2016055911 A1 | 4/2016 | |

OTHER PUBLICATIONS

JPO; Translation of Notice of Reasons for Rejection for Japanese Patent Application No. 2019-550575 dated Oct. 5, 2020, 3 pages.
JPO; Office Action for Japanese Patent Application No. 2019-550575 dated Oct. 5, 2020, 3 pages.

PRECURSORS FOR CATHODE MATERIAL WITH IMPROVED SECONDARY BATTERY PERFORMANCE AND METHOD TO PREPARE THE PRECURSORS

CROSS-REFERENCE TO RELATED APPLICATIONS

This application is a U.S. National Stage application of International Patent Application No. PCT/IB2017/051458, filed on Mar. 14, 2017.

TECHNICAL FIELD AND BACKGROUND

This invention relates to precursors for cathode materials for rechargeable lithium batteries and a process to produce these precursors. The cathode materials are so-called NMC cathode materials, where NMC stands for "nickel-manganese-cobalt-based". More particularly, this invention focuses on supplying precursors for NMC cathode materials with the aim that the final NMC cathode materials have a high specific surface area and ultra-low impurity level, therefore they are particularly suitable for power demanding applications like batteries for hybrid electric vehicles and power tools.

NMC cathode materials are generally prepared by solid state reactions, wherein a source of lithium—for example $Li_2CO_3$—is blended with a Ni—Mn—Co containing precursor, and the mixture is fired in an oxygen containing atmosphere—for example air—to yield the final lithium transition metal oxide powder (Li—NMC—$O_2$). Generally NMC has roughly the stoichiometry $LiMO_2$, where M is a transition metal mostly consisting of Ni, Mn and Co. The crystal structure is an ordered rock salt structure where the cations order into 2-dimensional Li and M layers. The space group is R-3M. NMC is a "mixed metal" cathode material, and it is known that NMC cannot be prepared from "non-mixed" precursors. For the cathode to work well in the battery, within the Li—M—$O_2$ crystal structure, the Ni, Mn and Co cations need to be well mixed. This is achieved by using mixed transition metal precursors, where the transition metal atoms are mixed at atomic scale. For NMC cathode preparation, usually a mixed metal hydroxide $M(OH)_2$, or its oxidized form MOOH, or a mixed carbonate $MCO_3$ is used as precursor. Both types of precursors have their advantages and disadvantages, as will be discussed below.

Mixed (oxy-)hydroxides are typically prepared by hydroxide precipitation reactions, for example by the precipitation from a flow of M-$SO_4$ mixed with NaOH and ammonia solutions under controlled pH, allowing precursors of suitable morphology to be precipitated. The NMC hydroxide raw material has a high tap density (TD) with a low specific surface area (expressed by the Brunauer-Emmett-Teller (BET) value), and consequently, NMC obtained after sintering thereof also has a low specific surface area and high TD. The typical BET and tap density values for an NMC hydroxide precursor with a particle size of 10 μm (D50=10 μm) are BET=2-5 $m^2$/g and TD≥2.0 $g/cm^3$, respectively. After sintering with Li salt, the tap density can be maintained, but the BET value will decrease to 0.2-0.4 $m^2$/g. Generally, a Li-ion battery with a high energy density can be achieved by using such high TD cathode materials. US patent US2009/0302267 describes a conventional NaOH—$NH_3$ precipitation process that can produce hydroxide precursors with a sodium content less than 1000 ppm. The Na content is controlled by a supplementary oxidation process of the hydroxide precursor.

Nowadays, there is a demand for batteries that are excellent in rate performance and cycle life stability, to be used in electric vehicles (xEV) and power tools. The cathode materials need to be able to support high power rates. A major rate performance limitation is the solid state diffusion rate of lithium ions within a single particle. Generally, the typical time for diffusion can be reduced—and thus a higher power can be achieved—if the solid state diffusion length decreases. The diffusion length can be decreased by reducing the particle size, but there are limitations since small particles have a low density, which is not desired because it causes problems during electrode coating, and the volumetric energy density of the final battery is low. Another option would be to increase the BET, but as said before, the specific surface area (BET) of commercial NMC cathode material consisting of dense particles produced from normal hydroxide precursors is typically in the range of 0.2-0.4 $m^2$/g. Obtaining powders where the particles have a relatively high tap density combined with a higher specific surface area remains a challenge for typical hydroxide precursors.

In a typical hydroxide precipitation process, ammonia acts as a chelating agent, which is necessary to produce spherical and dense precursor particles with relatively low BET values. After precipitation, the ammonia remains in the filter solution. As the ammonia cannot be released to the environment, the waste water is treated to remove—preferably to recycle—the ammonia. These ammonia installations are expensive and increase the capital investment significantly, as well as the operating cost for the waste treatment, in particular by the higher need for energy. It would therefore be desired to develop an ammonia-free precipitation process which supplies mixed transition metal precursors having a sufficient density and spherical morphology.

Comparing NMC carbonate precursors with equivalent NMC (oxy-)hydroxide precursors, the former have the advantage of a much higher specific surface area. Consequently, NMC obtained from carbonate precursors also has a higher specific surface area and a better rate performance compared to the NMC produced from commercial hydroxide precursors. In most of the prior art literature and patents, NMC carbonate precursors are produced through a carbonate precipitation process, by using a feed containing an NMC metal salts solution, a $CO_3^{2-}$ or $HCO_3^-$ solution and a chelating agent solution (e.g. ammonia). NMC metal sulfate, nitrate or chloride salt solutions can be used as feed solution. Because the sulfates are always cheaper than nitrates and chlorides, and because sulfates also show less corrosion issues to a stainless steel precipitation reactor, they are widely used for NMC precursor mass production. The precipitation agents are water soluble $CO_3^{2-}$ or $HCO_3^-$ containing compounds like $Na_2CO_3$, $NaHCO_3$, $K_2CO_3$ or $KHCO_3$, etc. Because of their lower cost, sodium salts are normally chosen as precipitation agent. The chelating agent is a $NH_4^+$ containing solution, which is selected from ammonia, $NH_4HCO_3$, $(NH_4)_2CO_3$ or urea etc. Some compounds like $NH_4HCO_3$, $(NH_4)_2CO_3$ or urea can act as both precipitation and chelating agents. US patent US2013/0032753 describes a carbonate precipitation process, using a Ni and Mn sulfate feed solution, $Na_2CO_3$ as precipitation agent and ammonia solution as chelating agent.

The conventional carbonate precursor producing method has two main drawbacks. On the one hand, the carbonate precipitation process is highly unstable. As a consequence, the particle size of the obtained carbonate precursor changes continuously during precipitation. It is indeed very difficult to tune the particle size of the carbonate precursor by changing the process parameters during the precipitation process, which makes it not flexible for mass production purposes. The need for precipitation stability and particle size tunability is one of the main challenges for the carbonate precipitation process. Practically, this problem can be solved by a simple seeding process, as is disclosed in PCT/IB2015/057491. After seeding, the carbonate precipitation process is very stable and the particle size of the carbonate precursor can be fine-tuned by changing the $M_{seeds}/M_{feed}$ molar ratio (molar ratio of the metal content in the seed slurry to the metal content in the feed solution), where the higher $M_{seeds}/M_{feed}$ molar ratio (higher seeds slurry flow rate) will result in a smaller particle size.

Another drawback of the carbonate precipitation process is the high impurity level in the obtained carbonate precursors. It is generally desired to obtain pure $MCO_3$ precursors for $LiMO_2$ cathode preparation. A high impurity content tends to reduce the reversible capacity of the $LiMO_2$ cathode due to the presence of an electrochemically "inert" second phase. So there tends to be a consensus that sulfur is not desired, and especially that the sodium impurity is harmful. The typical Na and S contents in a commercial NMC hydroxide precursor is below 300 ppm and 2000 ppm, respectively. In a carbonate precursor however, the Na and S levels always reach several thousand ppm, sometimes even above 10000 ppm. Such high impurity levels will result in a lower reversible capacity of the $LiMO_2$ cathode compared to a $LiMO_2$ produced from a hydroxide precursor. In US2013/0032753, the obtained carbonate precursor shows high impurity levels with a Na content of 0.05 to 1.5 wt %, a S content of 0.0005 to 0.12 wt % and a sum of the Na and S content being 0.07 to 1.6 wt %. In most of the examples, the sum of the Na and S content is above 0.5 wt %.

Several strategies have been reported to decrease the impurity levels in an NMC carbonate precursor. US2006/0121350 describes a special carbonate precipitation process such that the Na and S impurities in the obtained NMC carbonate are less than 100 ppm. The method comprises the steps of preparing an aqueous solution of lithium hydrogen carbonate, by blowing carbon dioxide gas into an aqueous solution of lithium carbonate, dripping an aqueous NMC chloride solution into the aqueous solution of lithium hydrogen carbonate, or dripping or charging the aqueous solution of lithium hydrogen carbonate into the aqueous NMC chloride solution, and subsequently driving out dissolved carbon dioxide gas by aerating the aqueous solution, thereby raising a pH value of the aqueous solution to cause carbonate to be precipitated. Because the NMC chloride and lithium hydrogen carbonate are used and no Na and S are contained in these chemicals at all, it is straightforward that a low Na and S impurity level can be reached in the final carbonate product. The cost of the chemicals and the special process is however prohibitive for large industrial application.

In US2013/0032753, in order to achieve a low impurity level, a special post-treatment procedure by washing is described. The obtained slurry of carbonate precursor particles is washed with an alkali and an acid, and thereafter with pure water so as to control the amounts of Na and S in the precursor. However, such a complicated post-treatment procedure increases the cost, which is not practical in a real mass production. High impurity levels still remain an issue, even when such complicated post-treatment is carried out.

There is a need to provide a precursor material that can combine both the advantages of the hydroxide precursor (the low impurity level and high TD) and of the carbonate precursor (the high specific surface area), to satisfy the requirements for high power Li-ion battery applications. The obtained precursor product should have a low impurity level without sacrificing the advantages of a carbonate precursor, i.e. the high BET value and relatively high tap density etc. This invention also aims at providing a method to produce high purity and highly porous precursor materials for NMC cathode materials although starting from a traditional NMC carbonate precursor with high impurity level, especially with high Na content. The method is also ammonia-free. The obtained NMC cathode material is then particularly suitable for use in power tools and automotive applications.

SUMMARY

The present invention aims at providing highly pure—especially an ultra-low Na level—and porous NMC precursors for NMC cathode material being particularly suitable to be applied in automotive and power tools applications. By increasing the specific surface area of the cathode materials the demand for rapid charge and discharge of the battery (what is known as a good rate performance) can be coped with. The final NMC cathode active material has a high specific capacity and rate capability.

Viewed from a first aspect, the invention can provide the following precursor embodiments:

Embodiment 1: A crystalline precursor compound for manufacturing a lithium transition metal based oxide powder usable as an active positive electrode material in lithium-ion batteries, the precursor having a general formula $M(O)_x(OH)_{2-x-y}(CO_3)_y$, with $0 \leq x \leq 1$, $0 < y \leq 0.03$ and $M=Ni_aMn_bCo_cA_d$, A being a dopant, with $0.30 \leq a \leq 0.90$, $0.10 \leq b \leq 0.40$, $0.10 \leq c \leq 0.40$, $d \leq 0.05$ and $a+b+c+d=1$. The obtained $M(O)_x(OH)_{2-x-y}(CO_3)_y$ precursor can be a mixture of MOOH, $M(OH)_2$ and $MCO_3$; or a precursor mixture comprising (or consisting of) $M_2(CO_3)(OH)_2$ and $MCO_3$, and possibly also $M(OH)_2$ and MOOH. The obtained precursor has a Na content less than 200 ppm, a S content less than 250 ppm, the precursor having a specific surface area with a BET value expressed in $m^2/g$ and a tap density TD expressed in $g/cm^3$, with a ratio $BET/TD \geq 30.10^4 cm^5/g^2$. It may also be that $0.3 \leq x \leq 0.9$, $1.1 \leq y \leq 1.7$, $x+y=2$.

Embodiment 2: The crystalline precursor having a tap density $TD \geq 1.0$ $g/cm^3$.

Embodiment 3: The crystalline precursor having a BET value$\geq 35$ $m^2/g$.

Embodiment 4: The crystalline precursor having a Na content less than 100 ppm, a S content less than 200 ppm, the sum of the Na and the S content being less than 300 ppm.

Embodiment 5: The crystalline precursor having a BET value$\geq 45$ $m^2/g$.

Embodiment 6: The crystalline precursor having a tap density $TD \geq 1.2$ $g/cm^3$.

Embodiment 7: The crystalline precursor having a median particle size (D50) between 5-25 μm.

Embodiment 8: The crystalline precursor having a carbon content 0.15 wt %.

Embodiment 9: The crystalline precursor wherein A is either one or more of Mg, Al, Ti, Zr, Ca, Ce, Cr, Nb, Sn, Zn and B. The advantage of having dopants can be either improvement on structural and thermal stability or enhancement on the lithium ionic conductivity of final lithiated product. Each of the individual precursor embodiments described here above can be combined with one or more of the precursor embodiments described before it.

Viewed from a second aspect, the invention can provide a lithium transition metal based oxide powder usable as an active positive electrode material in lithium-ion batteries, the powder having a general formula $Li_{x'}(Ni_{a'}Mn_{b'}Co_{c'}A_{d'})_{2-x'}$, A being a dopant, with $0.9 \leq x' \leq 1.1$, $0.30 \leq a' \leq 0.90$, $0.10 \leq b' \leq 0.40$, $0.10 \leq c' \leq 0.40$, $d' \leq 0.05$ and $a'+b'+c'+d'=1$, the powder having a Na content less than 200 ppm, a S content less than 250 ppm, the powder having a specific surface area with a BET value expressed in $m^2/g$ and a tap density TD expressed in $g/cm^3$, with a ratio $BET/TD \geq 1.10^4$ $cm^5/g^2$. In an embodiment the Na content is less than 100 ppm, the S content is less than 200 ppm, and the sum of the Na and the S content is less than 300 ppm. In another embodiment the BET value is $\geq 1$ $m^2/g$. In still another embodiment, the tap density $TD \geq 1.0$ $g/cm^3$ or even $\geq 1.1$ $g/cm^3$. It is clear that further lithium metal oxide powder embodiments according to the invention may be provided by combining features that are covered in each of the different powder embodiments described before.

The lithium transition metal based oxide powder may be obtained by blending the crystalline precursor compound according to the invention with $Li_2CO_3$ or LiOH with a Li:M molar ratio of 1.0-1.10, heating the blend up to a temperature between 500 and 580° C. with a rate of 4 to 6° C./min and then continuously heating up to a temperature between 750 and 980° C. with a rate of 1 to 2° C./min, soaking the blend at that temperature for 8 to 20 hours to obtain the lithium transition metal based oxide powder, and cooling down the powder to room temperature under a cooling speed of 4 to 6° C./min.

Viewed from a third aspect, the invention can provide the following method embodiments:

Embodiment 10: A method for preparing a crystalline precursor compound as described above, and having the general formula $M(O)_x(OH)_{2-x-y}(CO_3)_y$, with $0 \leq x \leq 1$., $0<y \leq 0.03$, the method comprising the steps of:
  providing a $MSO_4$ sulfate feed solution comprising Ni—, Mn—, Co— and A-ions,
  providing an ionic solution comprising either one or both of a carbonate and a bicarbonate solution, the ionic solution comprising either one or both of Na— and K-ions,
  mixing the sulfate feed solution and the ionic solution in a reactor with a $CO_3/M$ molar ratio $\geq 1.0$, thereby precipitating a M-carbonate intermediate product, and
  dispersing the M-carbonate intermediate product in a NaOH solution at a temperature between 70 and 95° C. with a OH/M molar ratio $\geq 2.0$, thereby precipitating a crystalline precursor. The $Na_2CO_3/MSO_4$ base/acid molar ratio is the same as the $CO_3/M$ molar ratio or the $CO_3/SO_4$ molar ratio.

Embodiment 11: The method, wherein the OH/M molar ratio is between 2.0 and 2.1.

Embodiment 12: The method, wherein the molar ratio $CO_3/M \geq 1.05$.

Embodiment 13: The method, comprising the additional steps of:
  filtering and washing the precursor until the conductivity of the filtrate reaches at most 50 μS/cm, and
  drying the filtered and washed precursor at a temperature between 120 and 160° C. for 12-36 hrs. in an air atmosphere.

Embodiment 14: The method, wherein:
  the $MSO_4$ sulfate feed solution has a molar content $M_{feed}$,
  besides the $MSO_4$ sulfate feed and the ionic solution a slurry is provided comprising seeds comprising M'-ions and having a molar metal content $M'_{seeds}$, wherein $M'=Ni_{x'}Mn_{y'}Co_{z'}A'_{n'}$, A' being a dopant, with $0 \leq x' \leq 1$, $0 \leq y' \leq 1$, $0 \leq z'1$, $0 \leq n' \leq 1$ and $x'+y'+z'n'=1$,
  the sulfate feed solution, the ionic solution and the slurry are mixed in a reactor with a $CO_3/M$ molar ratio $\geq 1.0$ and a molar ratio $M'_{seeds}/M_{feed}$ between 0.001 and 0.1, thereby precipitating the M-carbonate intermediate product on the seeds, and
  the M-carbonate intermediate product precipitated on the seeds is dispersed in the NaOH solution.

Embodiment 15: The method wherein a slurry comprising seeds is provided, wherein M=M'.

Embodiment 16: The method wherein a slurry comprising seeds is provided, wherein the seeds have a median particle size D50 between 0.1 and 3 μm, and wherein the M'-ions are present in a water insoluble compound that is either one of $M'CO_3$, $M'(OH)_2$, M'-oxide and M'OOH. It is clear that further method embodiments according to the invention may be provided by combining features that are covered in each of the different method embodiments described before.

DETAILED DESCRIPTION

The invention makes use of NMC carbonate precursors that can be produced by using mixed metal $MSO_4$ as feed solution, and a concentrated $Na_2CO_3$ solution as the precipitation agent, and the reaction is described as follows:

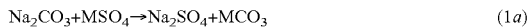

$$Na_2CO_3 + MSO_4 \rightarrow Na_2SO_4 + MCO_3 \quad (1a)$$

It is found that a chelating agent (e.g. ammonia) is not necessary for a carbonate precipitation, resulting in an ammonia—free process. Taking into account the cost of NaOH and ammonia recycling, a carbonate precipitation process without ammonia is cheaper than a typical hydroxide precipitation process. In the carbonate precipitation reaction, $Na_2CO_3$ is used, which is less corrosive than NaOH, and the pH during a carbonate precipitation is lower—that means it is less corrosive—than that of a hydroxide precipitation. As a result, a carbonate precipitation process can more easily be implemented at mass production scale. The authors observed that depending on precipitation process parameters, the final obtained carbonate precursor is not a pure $MCO_3$ phase. In a $Na_2CO_3$ precipitation process, it can be mixture of $MCO_3$ and hydroxy-carbonate $(M_2(CO_3)(OH)_2)$ or a hydroxy-carbonate in a $Na_2CO_3$ process. It is confirmed that there is no problem to use metal carbonate or the mixture of metal hydroxy-carbonate as a precursor for a cathode material. The hydroxy-carbonate $(M_2(CO_3)(OH)_2)$ is formed in the following "minority" reaction:

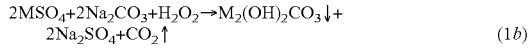

$$2MSO_4 + 2Na_2CO_3 + H_2O_2 \rightarrow M_2(OH)_2CO_3 \downarrow + 2Na_2SO_4 + CO_2 \uparrow \quad (1b)$$

Figure 1:
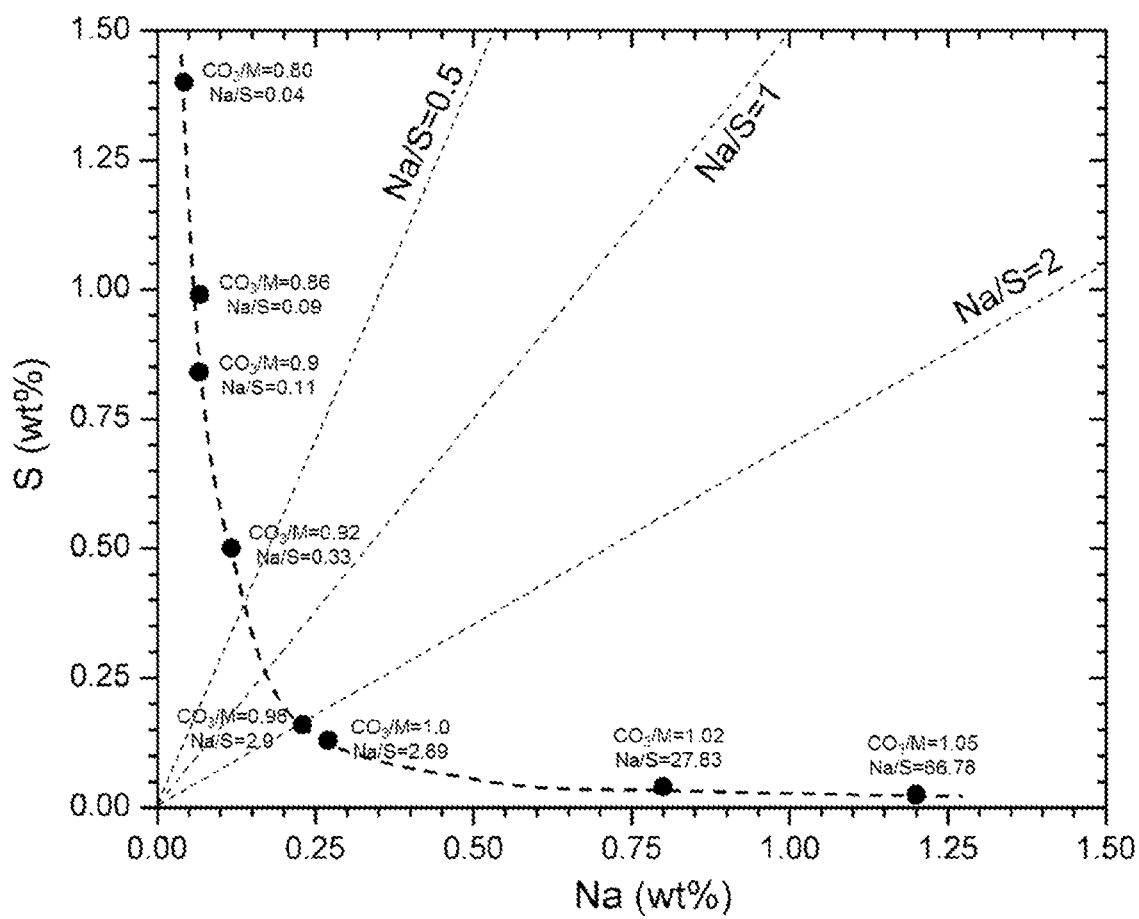
FIG. 1: Na—S impurity map for a series of $Ni_{0.5}Mn_{0.3}Co_{0.2}CO_3$ carbonate precipitations.

The authors also observed that—no matter what conditions are chosen—the precipitation of a highly pure mixed carbonate according to the reaction scheme (1a) or (1b)

above is not possible. Sodium and/or sulfur are always included in the precipitated particles and they cannot be efficiently removed through post-treatment such as filtration and washing, possibly being present within the crystal structure of the mixed carbonate. However, if certain precipitation parameters (e.g. temperature, residence time, agitation etc.) are fixed, the Na and S impurities absolute content in a NMC carbonate precursor is determined by both the $CO_3/M$ molar ratio during precipitation and the post-treatment procedures such as filtration and washing also has some impact. Generally speaking, part of the Na and S impurities can be removed through deionized water washing for several times after filtration. However, Na and S cannot be further removed from a NMC carbonate precursor when the conductivity of the filtration solution reaches a certain level, e.g. 500 μS/cm. So, the Na/S molar ratio in a NMC carbonate precursor is mainly determined by the $CO_3/M$ molar ratio during precipitation, and the post-treatment procedure has an impact on the Na and S absolute contents. FIG. 1 shows a Na—S impurity map for a series of $Ni_{0.5}Mn_{0.3}Co_{0.2}CO_3$ carbonate precipitations, based on the findings of PCT/IB2015/057492. Part of the Na and S impurities can be removed through washing with deionized water, but a high amount of impurities still remains in the carbonate precursor even after intense washing, because they are incorporated into the carbonate crystalline structure. High impurity levels will result in low reversible capacity and poor cycling performance of the $LiMO_2$ cathode due to the presence of the electrochemically "inert" second phase.

Figure 2:
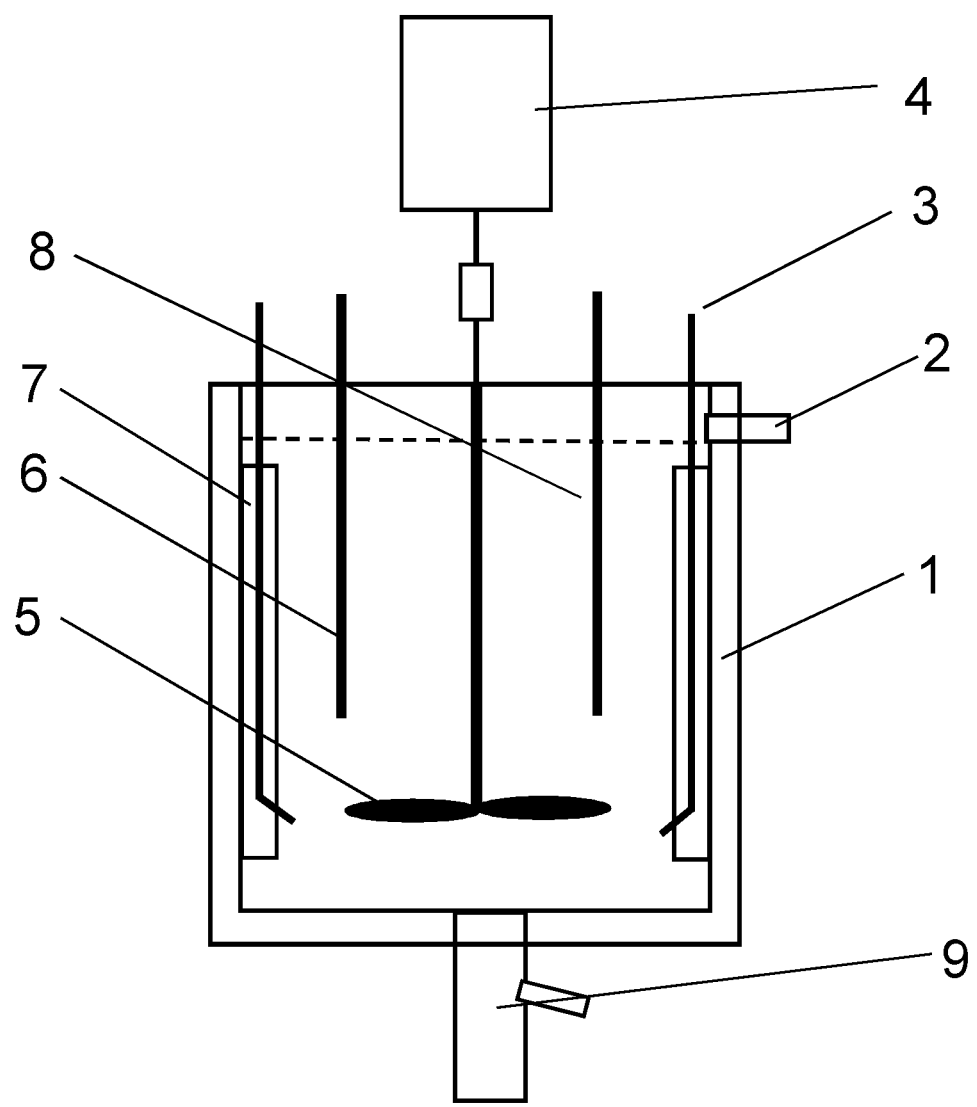
FIG. 2: Design of a typical 10 L CSTR reactor.

The carbonate based precursors could be simply precipitated by continuously inserting a flow of $MSO_4$ and a flow of $Na_2CO_3$ in a continuously stirred tank reactor (CSTR), as shown in FIG. 2, with the following details:

| 1 | Water jacket | 2 | Overflow |
| 3 | Dosing tube | 4 | Motor |
| 5 | Impeller | 6 | pH senor |
| 7 | Baffle | 8 | Temperature sensor |
| 9 | Outlet valve | | |

Alternatively the precipitation reaction can also be performed in a batch process. Besides the basic flows of sodium carbonate and metal sulfate, further flows can be added like metal chlorides, sodium bicarbonate, ammonium carbonate etc. Normally, the carbonate precipitation process is carried out at an elevated temperature, e.g. 60° C., or even up to 95° C.

The authors observed that during the metal carbonate precipitation, it may be difficult to keep the particle size stable compared to the hydroxide precipitation—meaning that it is more difficult to run a steady state precipitation by controlling the $Na_2CO_3/MSO_4$ base/acid flow rate (which is the same as the $CO_3/M$ molar ratio or the $CO_3/SO_4$ molar ratio). The authors observed that a low flow rate ratio, which results in a desired Na/S impurity ratio, also always results in small and fine particles, often smaller than 10 μm. In addition, the tap density is relatively low for such precipitation conditions. The current invention supplies a solution to these problems. The carbonate precursor is precipitated at a relatively high $Na_2CO_3/MSO_4$ molar ratio, normally more than 1.0, preferably more than 1.05. Spherical carbonate precursors with a relatively high tap density ($\geq 1.4$ g/cm$^3$) and large particle size ($\geq 10$ μm) can be produced. In some NMC compositions, large particles with a particle size of more than 20 μm can be produced at a high $Na_2CO_3/MSO_4$ molar ratio, e.g. $CO_3/M \geq 1.05$. In some embodiments, a seeding process as is disclosed in PCT/IB2015/057491 can be applied to decrease the particle size to the desirable range by controlling the $M_{seeds}/M_{feed}$ ratio (the flow rate of seeds slurry). In addition, the carbonate precipitation process stability evidently can be improved after seeding. However, it should be emphasized that the particle size for a NMC carbonate based precipitation depends on both the NMC composition and the precipitation parameters. Not all NMC compositions result in a large particle size under a high $CO_3/M$ molar ratio, which indicates that the seeding process is not factually indispensable in some cases, like the $Ni_{0.38}Mn_{0.29}Co_{0.33}$ carbonate based composition described in the examples.

It follows that the carbonate precipitation process is mainly controlled by the following parameters:

Stirring speed of impeller
Temperature
Residence time
pH
Metal concentration
$CO_3/M$ molar ratio (also defined as $CO_3/SO_4$ molar ratio)
$M_{seeds}/M_{feed}$ molar ratio.

During firing of the carbonate based precursor, not only the lithium transition metal cathode is formed, but also the remaining sodium and sulfur impurities react. The fact that impurities are always present is possibly one reason that generally carbonate precipitation is seen as a process that does not allow to obtain good NMC cathode materials. It was found by the inventor that in the prior art carbonate precursor processes there are two specific requirements for the Na and S impurity levels to achieve good electrochemical performances:

0.4<Na/S<2, and preferably 0.5<Na/S<1; and
Na+S≤0.5 wt %.

If these conditions are not being met, electrochemical inactive compounds like $Li_2SO_4$ or $Na_2SO_4$ form, which have a negative impact on the specific capacity, rate and cyclic performance of the NMC cathode material. Such specific impurity requirements can be reached by precipitating the carbonate precursor at relatively low $CO_3/M$ molar ratio precipitation conditions, as can be seen in FIG. 1. It follows that in the carbonate precipitation process, from an electrochemical standpoint, the $CO_3/M$ molar ratio should be set at less than 1.0, more preferably it is less than 0.95.

However, this is contrary to what was said before about the base/acid ratio, and carbonate precursors precipitated below the stoichiometric point ($CO_3/M=1.0$) will have several drawbacks:

part of the metal will not be precipitated and will be lost during filtration, which will bring about environmental issues. Extra cost is needed to eliminate the metal from the filtration solution;

it is difficult to precipitate spherical and dense carbonate particles;

fine carbonate particles are always precipitated, which make it difficult for post-treatment (filtration, washing and drying). In addition, fine cathode particles will bring safety issues in a real Li-ion battery. So, fine precursor particles should be avoided during the precipitation process.

From the mass production point of view, it is preferred to produce spherical and dense carbonate based precursors with a relatively large particle size, above the stoichiometric point ($CO_3/M \geq 1.0$). However, precipitation at $CO_3/M \geq 1.0$ will result in a high Na/S molar ratio (Na/S≥2.0), as is illustrated in FIG. 1. In addition, the total impurity (Na+S)

level is always above 1.0 wt %, or even above 2.0 wt %, which results in a low reversible capacity and a poor cyclic performance. The obtained carbonate based precursor slurry would need to be washed with deionized water several times through a press filter, until the conductivity of the filtration solution is below 500 μS/cm. Still, carbonate based precursors precipitated under such conditions will result in a high Na content above 2500 ppm, in some cases even higher than 5000 ppm, depending on the NMC composition. On top of that, the total impurity content in the obtained carbonate based product is always higher than 0.5 wt %, sometimes even reaching 1.0 wt %, also depending on the NMC metal composition. On the other hand, the obtained carbonate based precursor always has elevated BET values—at least above 50 m$^2$/g, or even above 100 m$^2$/g, depending on the NMC metal composition.

In this invention—and contrary to the prior art—the carbonate based precursors are precipitated under the condition CO$_3$/M≥1.0, and are subsequently subjected to a carbonate-hydroxide ion exchange reaction that can take place when the carbonate based precursor is dispersed in a diluted NaOH solution, in a stainless steel reactor under agitation. In an embodiment the metal concentration is 15-50 g/L and a (Na)OH/M molar ratio is set between 2.01 and 2.10. The agitation speed is 100-250 rpm and the reactor is protected by a N$_2$ atmosphere, with a N$_2$ flow rate of 1-5 L/min. The reactor is heated up to 70-95° C. under stirring and maintained at such temperature for 1-5 hrs. The higher the temperature the faster the ion exchange reaction takes place. Taking into account the water evaporation the maximum reaction temperature is limited to 95° C.

The reaction scheme is the following:

MCO$_3$+2NaOH→M(OH)$_2$+Na$_2$CO$_3$

M$_2$(OH)$_2$CO$_3$+2NaOH→2M(OH)$_2$+Na$_2$CO$_3$ (minor) (2)

It can be verified by a thermodynamic calculation that the carbonate-hydroxide ion exchange reaction has a negative Gibbs free energy at room temperature, which indicates that the carbonate phase will be converted to hydroxide after the carbonate based precursor is dispersed into the NaOH solution. The carbonate-hydroxide conversion can be confirmed by comparing the XRD patterns before and after the ion exchange reaction. The XRD pattern of e.g. Ni$_{0.38}$Mn$_{0.29}$Co$_{0.33}$ carbonate shows a mixture of a carbonate phase and certain double salts, linked to its high Na and S impurity levels. After the ion exchange reaction, the XRD pattern may show a mixture of 80% MOOH and 20% M(OH)$_2$ (or M (O)$_{0.8}$ (OH)$_{1.2}$) because of air oxidation of the hydroxide. From the XRD and chemical analysis results, it is concluded that carbonate precursor can be converted to (partly oxidized) crystalline hydroxide precursor compound through the ion exchange reaction.

During the carbonate-hydroxide ion exchange reaction the Na and S impurities are almost completely leached out of the precursor particles. Through such a carbonate-hydroxide ion exchange reaction procedure, the advantages of a hydroxide precursor (low impurity levels, relative high TD) and a carbonate precursor (high specific surface area) can be combined in the obtained precursor product. After the ion exchange reaction the typical impurity level is Na≤100 ppm and S≤200 ppm, which is much lower than a typical NMC hydroxide precursor (Na=150-250 ppm and S=1000-1500 ppm) when starting from MSO$_4$ salts. After the carbonate-hydroxide ion exchange reaction (2) is finished, the reactor is cooled down and discharged. The obtained slurry is filtered and washed through a press filter with deionized water, until the conductivity of the filtration solution reaches 50 μS/cm. The obtained wet cake is dried at 150° C. for 24 hrs. in an oven in air atmosphere. After the ion exchange reaction, the particle size is slightly increased and the tap density slightly decreases as a consequence. Also the BET value slightly decreases, but it is still much higher than for a typical hydroxide precursor product.

Using the hydroxide precursor after the ion-exchange reaction, an NMC cathode material may be prepared. For the NMC cathode material, relatively large, spherical and relatively dense particles which have an open, interconnected meso or nano porosity are preferred, and are referred to as "NMC with preferred morphology". The open, interconnected porosity contributes to the internal surface, so NMC with the preferred morphology has a much higher specific surface area (BET value) than can be expected if they originate from prior art dense hydroxide particles having the same shape and particle size. In order to achieve a good rate performance, the NMC cathode with preferred morphology typically may have a BET surface area of 1 m$^2$/g or higher. In the battery, the pores in the NMC with preferred morphology will be filled with electrolyte which acts as a diffusion highway into the particles, because liquid diffusion is much faster than diffusion in solid particles.

A further aspect of the invention is a loop process to prepare the NMC precursors according to the invention through an ion exchange reaction. Na$_2$CO$_3$ is the byproduct after the ion exchange reaction, which can be used as the ionic solution for the carbonate precursor precipitation. The loop process can be described by the following reactions:

Reaction 1: MSO$_4$+Na$_2$CO$_3$→MCO$_3$+Na$_2$SO$_4$

2MSO$_4$+2Na$_2$CO$_3$+H$_2$O→M$_2$(OH)$_2$CO$_3$↓+2Na$_2$SO$_4$+ CO$_2$↑ (minor) (1)

Reaction 2: MCO$_3$+2NaOH→M(OH)$_2$+Na$_2$CO$_3$

M$_2$(OH)$_2$CO$_3$+2NaOH→2M(OH)$_2$+Na$_2$CO$_3$ (minor) (2)

Overall reaction: MSO$_4$+2NaOH→M(OH)$_2$+Na$_2$SO$_4$ (3)

In principle, this is an ammonia free precipitation process and Na$_2$CO$_3$ actually acts as a "medium" to produce high specific surface area precursor product. The ultra-high BET value in the carbonate precursor can be maintained through a carbonate-hydroxide ion exchange reaction. Through such novel carbonate-hydroxide ion exchange reaction, the advantages of carbonate and hydroxide precursors can be combined into one product, which is beneficial for its practical application in a high-power Li-ion battery.

The hydroxide or oxidized hydroxide based precursor of the invention is blended with Li$_2$CO$_3$ or LiOH with a Li:M molar ratio of 1.0-1.10—assuming that the Li$_2$CO$_3$ has a purity of 97%. By applying a suitable firing profile, the open porosity remains in the final cathode product. For a Ni$_{0.38}$Mn$_{0.29}$Co$_{0.33}$ composition for example, carbonate, hydroxide or oxidized-hydroxide precursors may be blended with Li$_2$CO$_3$ or LiOH with a Li:M molar ratio of 1.08 and then calcined in air with a specific profile: heating up to 550° C. with a rate of 5° C./min and then continuously heating up to 910° C. with a rate of 1.5° C./min. After holding at 910° C. for 10 hours, then cool down to room temperature under a cooling speed of 5° C./min. In an embodiment of this patent a carbonate precursor is provided that allows the preparation of NMC cathode powders with higher surface area and open porosity, making the obtained NMC cathodes especially suitable for high power applications.

The specific surface area of the precursors and final products is measured by a standard Brunauer-Emmett-Teller (BET) method and carried out on a Quantachrome® Autosorb instrument. Before the BET measurement, the sample is degassed at 200° C. for 6 hrs., to get rid of the moisture completely. The particle size is measured with a Malvern® MasterSizer2000. The tap density (TD) measurement is carried out by mechanically tapping a graduated measuring cylinder (100 ml) containing the sample (having a mass W, around 60-120 g). After observing the initial powder volume, the measuring cylinder is mechanically tapped for 5000 times according to the tap density measurement procedure ASTM B527 described, so that no further change in volume (V in $cm^3$) or mass (W) is observed. The TD is calculated as TD=W/V. The TD measurement is carried out on an ERWEKA® instrument.

Coin cells are prepared according to Umicore internal standard procedures for RL4345N. Electrodes are prepared as follows: about 27.27 wt % of active cathode material, 1.52 wt % polyvinylidene fluoride polymer (KF polymer L #9305, Kureha America Inc.), 1.52 wt % conductive carbon black (Super P, Erachem Comilog Inc.) and 69.70 wt % N-methyl-2-pyrrolidone (NMP) (from Sigma-Aldrich) are intimately mixed by means of high speed homogenizers. The obtained slurry is spread in a thin layer (typically 100 micrometer thick) on an aluminum foil by a tape-casting method. After evaporating the NMP solvent, the cast film is processed through a roll-press using a 40 micrometer gap. Electrodes are punched from the film using a circular die cutter measuring 14 mm in diameter. The electrodes are dried overnight at 90° C. The electrodes are subsequently weighed to determine the active material loading. Typically, the electrodes contain 90 wt % active materials with an active materials loading weight of about 17 mg (~11 $mg/cm^2$). The electrodes are then put in an argon-filled glove box and assembled within the coin cell body. The anode is a lithium foil having a thickness of 500 micrometers (origin: Hosen); the separator is a Tonen 20MMS microporous polyethylene film. The coin cell is filled with a 1M solution of LiPF6 dissolved in a mixture of ethylene carbonate and dimethyl carbonate in a 1:2 volume ratio (origin: Techno Semichem Co.). Each cell is cycled at 25° C. using Toscat-3100 computer-controlled galvanostatic cycling stations (from Toyo). The coin cell testing protocol is given in Table 1:

Coin cells are prepared wherein the electrode consists of 90 wt % of active material. The electrode loading is about 11 $mg/cm^2$. The discharge capacity of the first cycle ($1^{st}$ DQ in mAh/g), the $1^{st}$ coulombic efficiency ($1^{st}$ CE: the ratio—in % for a charge-discharge cycle—between the energy removed from a battery during discharge compared with the energy used during charging), the difference between the average voltage on charge versus discharge (CV-DV in mV) and the rate performance of the 1C, 2C & 3C rate versus the 0.1C rate (in %) is reported. The discharge capacity DQ1 is measured during the first cycle in the 4.3-3.0 V range at 0.1C (in mAh/g), at 25° C.

The invention is further illustrated in the following examples, but is not limited by these examples:

EXAMPLE 1

Preparation of feed solution: $NiSO_4$, $MnSO_4$ and $CoSO_4$ are dissolved in deionized water and a transition metal solution is prepared, with a concentration of Ni, Mn and Co of 0.72 mol/L, 0.55 mol/L and 0.63 mol/L, respectively, corresponding to a molar ratio Ni:Mn:Co=38:29:33. For providing the carbonate solution, $Na_2CO_3$ is dissolved in deionized water and a 1.65 mol/L $Na_2CO_3$ solution is prepared.

For preparing a seed slurry, seeds are prepared by bead milling large carbonate particles with the composition Ni:Mn:Co=38:29:33—which are produced from a normal carbonate process without seeding—to decrease the median particle size (D50) to 0.5-2 μm. The seeds are re-dispersed in water under stirring to form a homogeneous slurry with 200 g/L solid load level.

The feed solution, carbonate solution and seed slurry are continuously pumped into a 10 L CSTR reactor set at a precipitation temperature of 90° C., with an impeller stirring speed of 1000 rpm. The molar ratio of $CO_3$:M (Metal) is fixed at 1.0 and the molar ratio of $M_{seeds}/M_{feed}$=0.005, the residence time is set at 3 hrs. This procedure is discussed in PCT/IB2015/057491: after seeding, the carbonate precipitation process is very stable and the particle size of the carbonate precursor can be fine-tuned by changing the $M_{seeds}/M_{feed}$ molar ratio. The carbonate based precursor slurry is collected through the overflow of the reactor. Then, a solid-liquid separation of the obtained precursor slurry takes place in a press filter, where the obtained solid is washed with deionized water several times until the conductivity of the filtering water drops below 500 μS/m.

TABLE 1

| RL4345N schedule - with 1 C = 160 mA/g. | | | | | | | | | |
|---|---|---|---|---|---|---|---|---|---|
| Charge | | | | Discharge | | | | | |
| C Rate | E-Curr | Rest (min) | V | Rate | E-Curr | Rest (min) | V | Num # | Num total |
| 0.10 | — | 30 | 4.3 | 0.10 | — | 30 | 3.0 | 1 | 1 |
| 0.25 | 0.05 C | 10 | 4.3 | 0.20 | — | 10 | 3.0 | 1 | 2 |
| 0.25 | 0.05 C | 10 | 4.3 | 0.50 | — | 10 | 3.0 | 1 | 3 |
| 0.25 | 0.05 C | 10 | 4.3 | 1.00 | — | 10 | 3.0 | 1 | 4 |
| 0.25 | 0.05 C | 10 | 4.3 | 2.00 | — | 10 | 3.0 | 1 | 5 |
| 0.25 | 0.05 C | 10 | 4.3 | 3.00 | — | 10 | 3.0 | 1 | 6 |
| 0.25 | 0.1 C | 10 | 4.5 | 0.10 | — | 10 | 3.0 | 1 | 7 |
| 0.25 | 0.1 C | 10 | 4.5 | 1.00 | — | 10 | 3.0 | 1 | 8 |
| 0.50 | 0.1 C | 10 | 4.5 | 1.00 | — | 10 | 3.0 | 25 | 9-33 |
| 0.25 | 0.1 C | 10 | 4.5 | 0.10 | — | 10 | 3.0 | 1 | 34 |
| 0.25 | 0.1 C | 10 | 4.5 | 1.00 | — | 10 | 3.0 | 1 | 35 |
| 1.00 | — | 10 | 4.5 | 1.00 | — | 10 | 3.0 | 25 | 36-60 |

Figure 3:
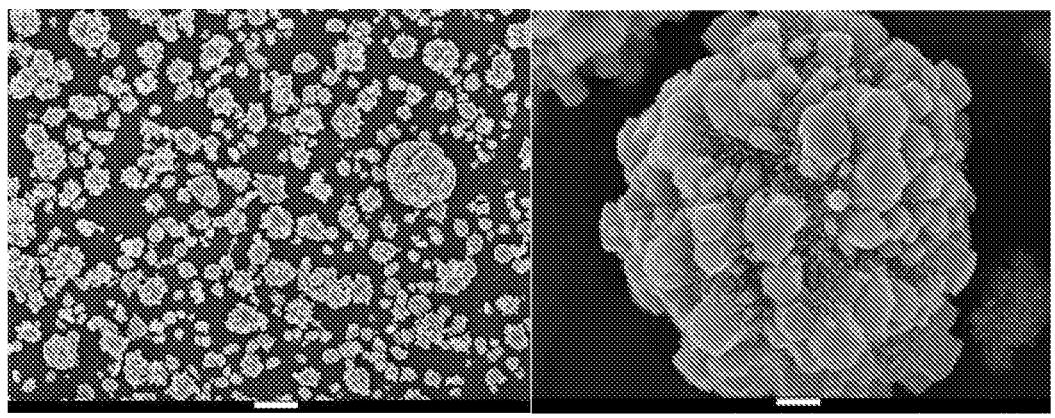
FIG. 3: SEM images of CZX 7.
Figure 4:
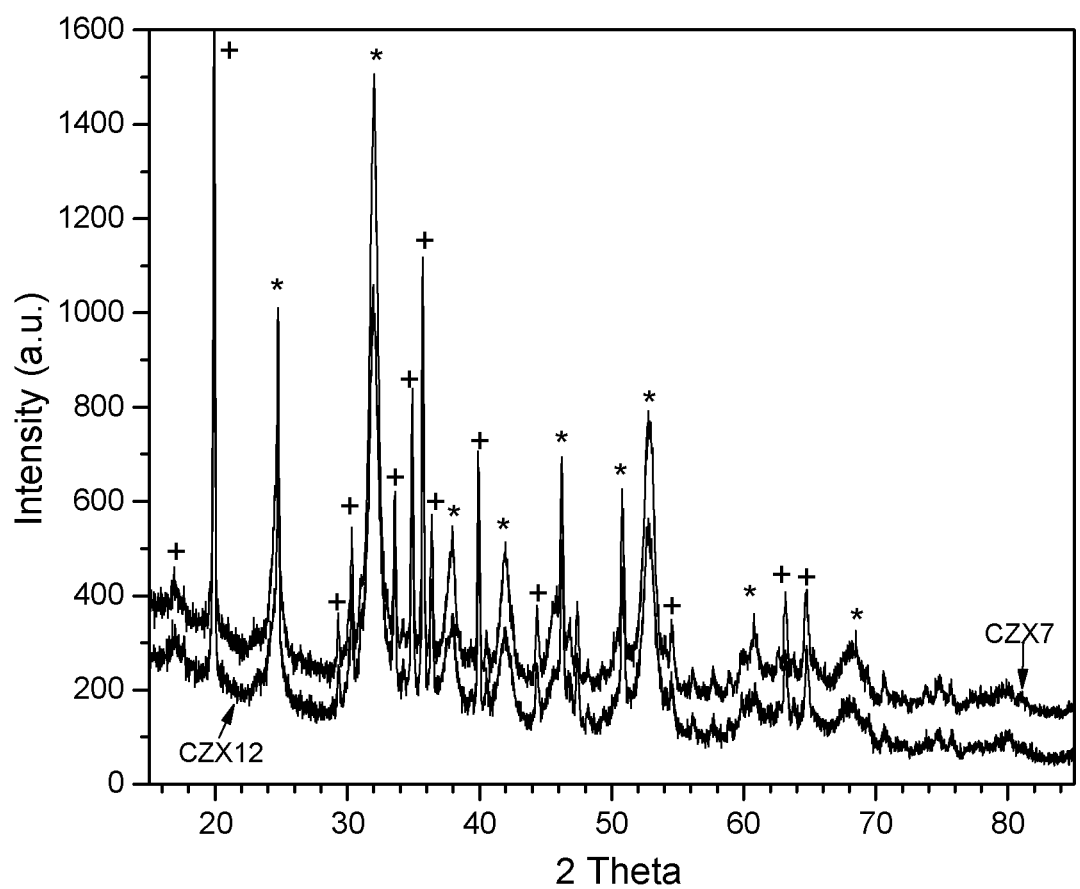
FIG. 4: XRD patterns of CZX 7&12.

The morphology of the obtained carbonate based precursor, labelled as CZX7, is shown in FIG. 3: SEM images of CZX7 with a median particle size of 6.9 μm. The left figure has a magnification ×1000 (the white bar corresponding to 10 μm), the right figure has magnification ×10000 (white bar=1 μm). The physiochemical properties of CZX7 are listed in Table 2, and the XRD pattern of CZX7 is the top pattern of FIG. 4. Peaks corresponding to double salts are indicated by (+), peaks corresponding to a carbonate phase are indicated by (*). Double salts are salts containing more than one cation or anion, and are obtained by combination of two different salts which were crystallized in the same regular ionic lattice. It is confirmed by the XRD that species similar to $Na_2M_8(CO_3)_6(OH)_6 \cdot 6H_2O$ (M=Ni, Co, Mn) double salt is formed during the carbonate precipitation. The data in Table 2 indicate that the carbonate precursor has a very high Na and S content, and a very high BET value.

Figure 5:
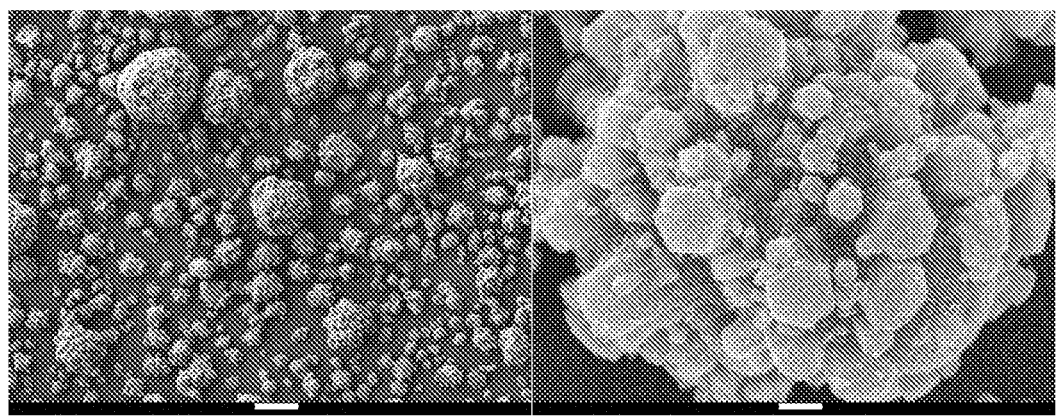
FIG. 5: SEM images of PCZX 7.
Figure 6:
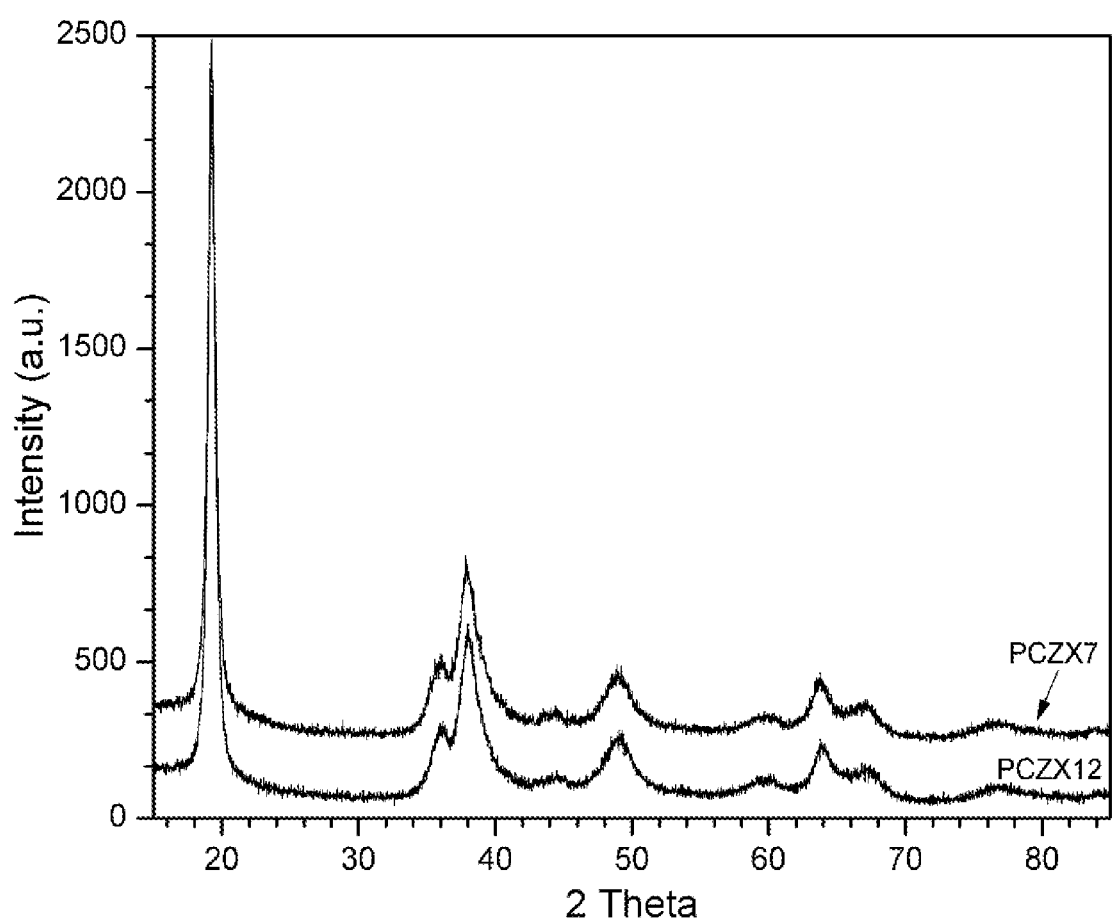
FIG. 6: XRD powder diffraction patterns of PCZX 7&12 after ion exchange reaction.

The thus obtained wet cake is dispersed in a diluted NaOH solution in a 20 L stainless steel reactor under agitation, with a metal concentration of 25 g/L and a NaOH/M molar ratio of 2.05. The agitation speed is between 100-250 rpm and the reactor is protected by a $N_2$ atmosphere with a $N_2$ flow rate of 1-5 L/min. The reactor is heated up to 90° C. under stirring and maintained at that temperature for 2 hrs. After the carbonate-hydroxide ion exchange reaction is finished (after the reaction is conducted for 1-4 hours), the reactor is cooled down and discharged. The obtained slurry is filtered and washed through a press filter with deionized water, until the conductivity of the filtration solution reaches 50 μS/cm. The obtained wet cake is dried at 150° C. for 24 hrs. in an oven in air atmosphere. The morphology of the obtained PCZX7 precursor is shown on the SEM image of FIG. 5 (having the same magnifications and significance of the white bars as FIG. 3), the median particle size being 8.2 μm, its physiochemical properties are listed in Table 3, and the XRD pattern of PCZX7 precursor is the top pattern in FIG. 6. The data in Table 3 show that the "ion-exchanged" hydroxide precursor now has a much lower Na and S content—as is typical for a hydroxide precursor, but still a very high BET value which is not typical for a hydroxide precursor. The tap density is acceptable. In addition, the carbon content drops from 7.3 wt % in CZX7 to 0.11 wt % in PCZX7, which indicates that 98.5% of carbonate is converted to hydroxide after the ion-exchange reaction.

Figure 7:
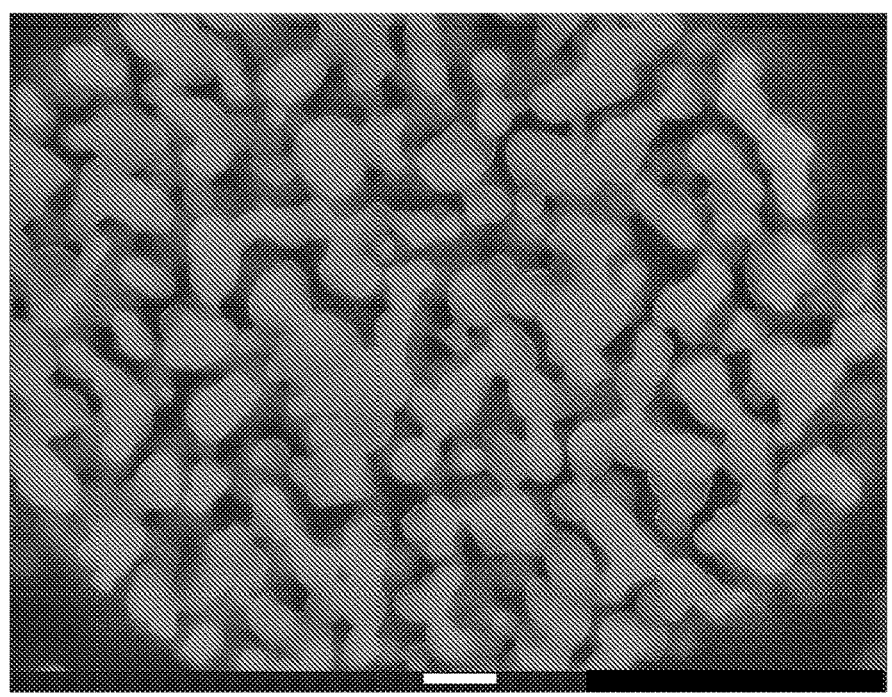
FIG. 7: Cross-section SEM images of sample ZX-P 7.
Figure 8:
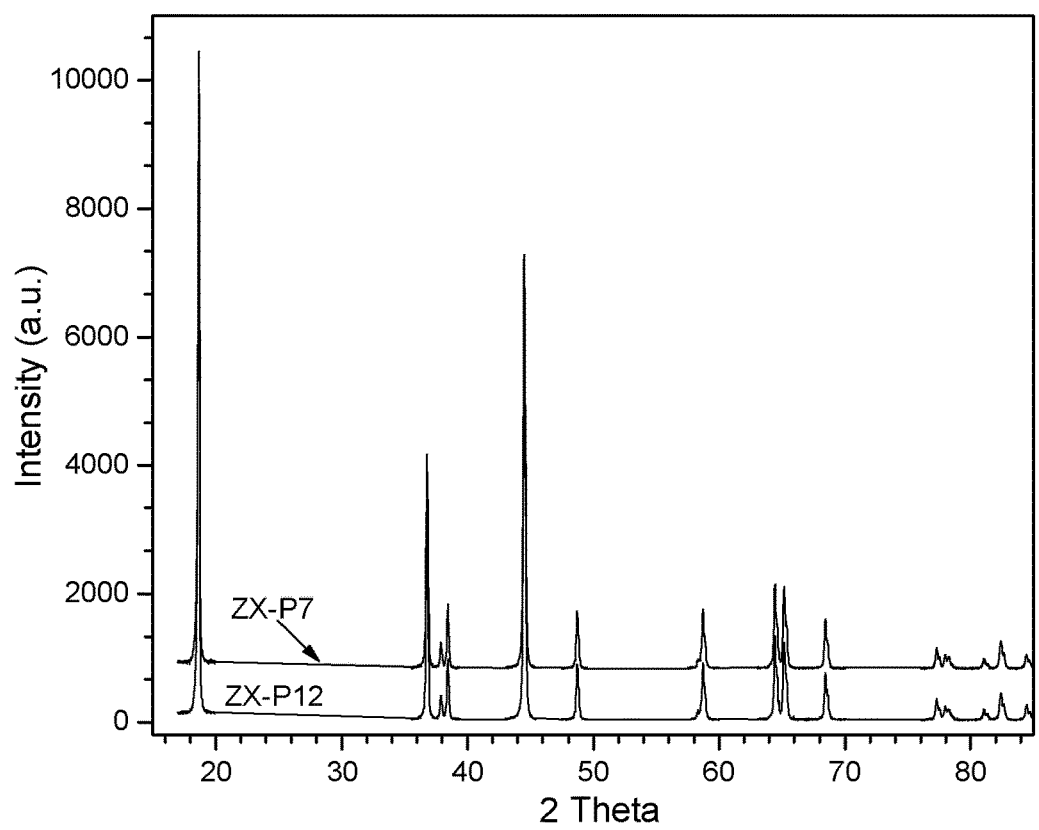
FIG. 8: XRD patterns of ZX-P 7&12.

Then, the obtained PCZX7 precursor is blended with $Li_2CO_3$ with a Li:M molar ratio of 1.10-assuming that $Li_2CO_3$ has a purity of 97%. 1 kg of this blend is slowly heated to 970° C. in a flow of air of 10 L/kg.min, and the sintering is continued for 10 hrs. After cooling, the sample is sieved and called ZX-P 7. The cross-section SEM images of ZX-P 7 is shown in FIG. 7 (magnification ×10000, the white bar corresponding to 1 μm) where the porous structure linked to the high BET value can be clearly observed (BET: see Table 5). The XRD pattern of ZX-P 7 is shown in FIG. 8, top pattern. The coin cells are prepared as described before. The results of the electrochemical tests of ZX-P 7 are given in Table 4.

EXAMPLE 2

Preparation of feed solution: $NiSO_4$, MnSat and $CoSO_4$ are dissolved in deionized water and a transition metal solution is prepared, with a concentration of Ni, Mn and Co of 0.72 mol/L, 0.55 mol/L and 0.63 mol/L (Ni:Mn:Co=38:29:33), respectively. For preparing the carbonate solution, $Na_2CO_3$ is dissolved in deionized water and a 1.65 mol/L $Na_2CO_3$ solution is obtained. As in Example 1, the feed and carbonate solution are pumped into a 10 L CSTR reactor, with an impeller stirring speed of 1000 rpm. The molar ratio of $CO_3$:Metal=1.0 and the residence time is set at 3 hrs. The precipitation temperature is 90° C.

Figure 9:
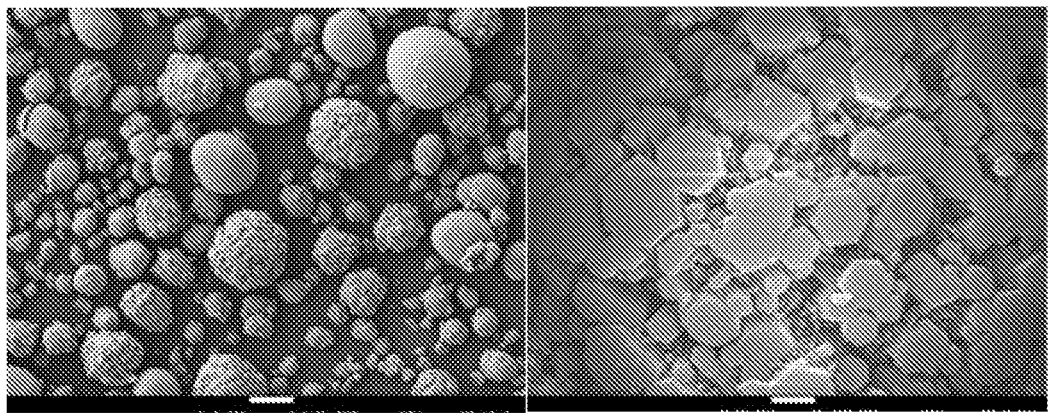
FIG. 9: SEM images of CZX 12.

The carbonate based precursor slurry is collected through the overflow of the reactor. The post-treatment procedure of the carbonate based precursor is the same as described in Example 1. The morphology of the obtained carbonate based precursor, labelled as CZX12, is shown in FIG. 9: SEM images (having the same magnifications and significance of the white bars as FIG. 3) showing a median particle size of 11.8 μm, and its physiochemical properties are listed in Table 2. The XRD pattern of the CZX12 carbonate based precursor is the bottom pattern in FIG. 4.

Figure 10:
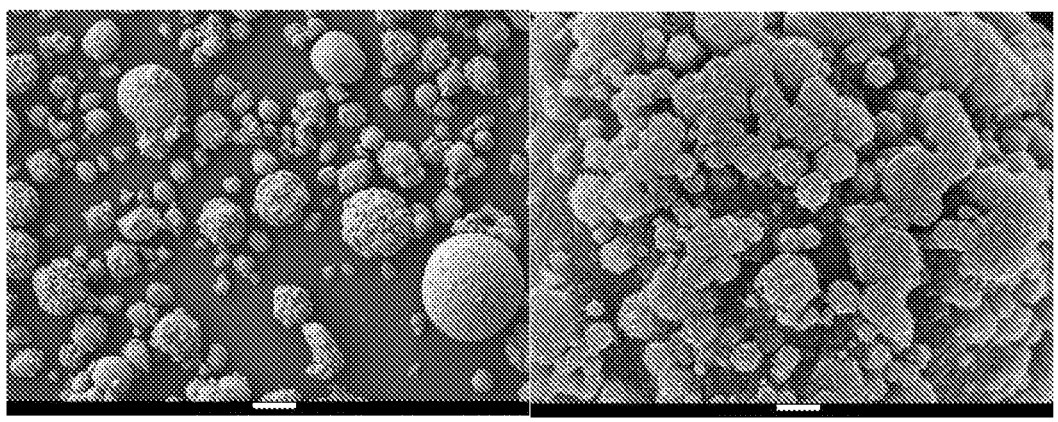
FIG. 10: SEM images of PCZX 12.
Figure 11:
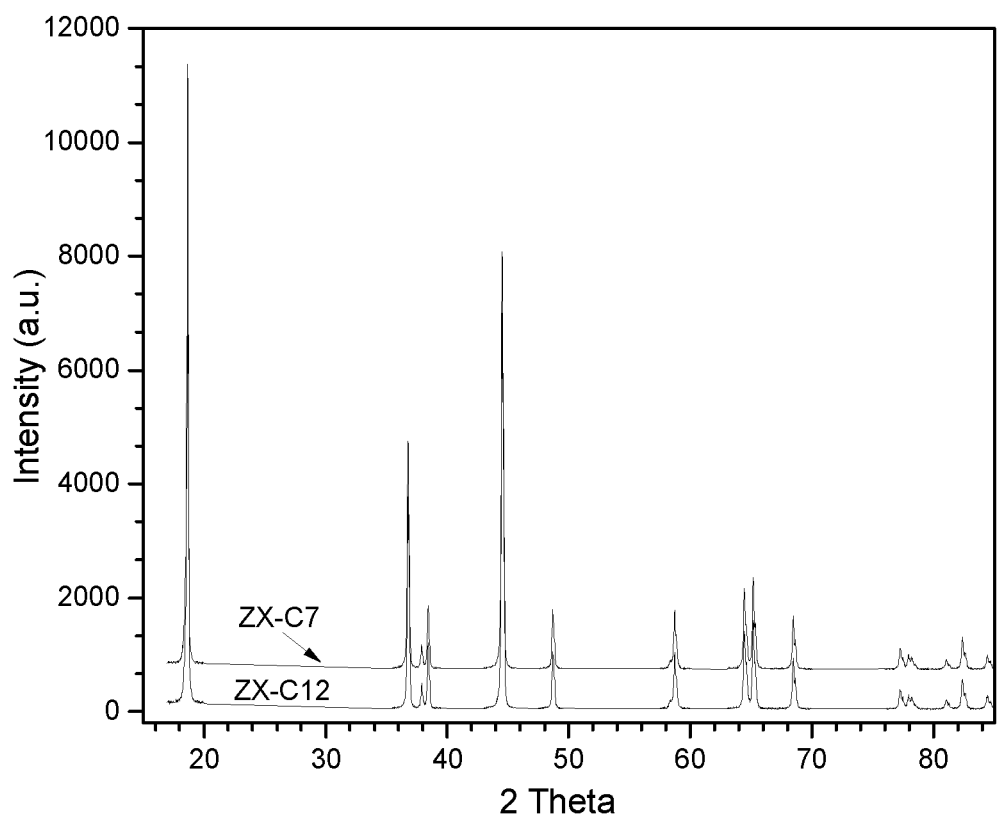
FIG. 11: XRD patterns of ZX-C 7&12.

The obtained wet cake is dispersed into a diluted NaOH solution in a 20 L stainless steel reactor under agitation, and the ion exchange reaction is carried out as described in Example 1. After the carbonate-hydroxide ion exchange reaction is finished the reactor is cooled down and discharged. The obtained slurry is filtered and washed over a press filter with deionized water, until the conductivity of the filtration solution reaches 50 μS/cm. The obtained wet cake is dried at 150° C. for 24 hrs. in an oven in air atmosphere. The morphology of the obtained PCZX12 precursor is shown in FIG. 10: SEM images (having the same magnifications and significance of the white bars as FIG. 3) showing a median particle size of 12.1 μm, and its physiochemical properties are listed in Table 3. The XRD pattern of the PCZX12 precursor is the bottom pattern in FIG. 6. The conclusions from Table 2 and 3 are equivalent to Example 1. The carbon content drops from 7.2 wt % in CZX12 to 0.097 wt % in PCZX12, which indicates that 98.7% of carbonate is converted to hydroxide after the ion-exchange reaction.

Then, the obtained PCZX12 hydroxide based precursor is blended with $Li_2CO_3$ with a Li:M molar ratio of 1.10—assuming that $Li_2CO_3$ has a purity of 97%. 1 kg of this blend is slowly heated to 970° C. in a flow of air of 10 L/kg.min, and sintering is continued for 10 hrs. After cooling, the sample is sieved and labelled ZX-P 12. Coin cells are prepared as described in the text. The results of the electrochemical tests of ZX-P 12 are given in Table 4.

TABLE 2

Physiochemical properties of CZX7 & CZX12 carbonate compounds.

| Carbonate precursor | Na (ppm) | S (ppm) | C (wt %) | BET ($m^2/g$) | TD ($g/cm^3$) | D10 (μm) | D50 (μm) | D90 (μm) | Span |
|---|---|---|---|---|---|---|---|---|---|
| CZX7 | 11200 | 2100 | 7.3 | 65.2 | 1.24 | 2.3 | 6.9 | 17.1 | 2.14 |
| CZX12 | 9000 | 2200 | 7.2 | 92.0 | 1.50 | 4.5 | 11.8 | 24.7 | 1.71 |

TABLE 3

Physiochemical properties of the obtained precursor after ion exchange reaction.

| Precursor compounds | Na (ppm) | S (ppm) | C (wt %) | BET (m²/g) | TD (g/cm³) | D10 (μm) | D50 (μm) | D90 (μm) | Span |
|---|---|---|---|---|---|---|---|---|---|
| PCZX7 | 70 | <200 | 0.11 | 51.7 | 1.04 | 3.3 | 8.2 | 22.4 | 2.34 |
| PCZX12 | 50 | <200 | 0.097 | 55.7 | 1.24 | 5.5 | 12.1 | 24.3 | 1.56 |

COUNTER EXAMPLE 3

Preparation of feed solution: $NiSO_4$, $MnSO_4$ and $CoSO_4$ are dissolved in deionized water and a transition metal solution is prepared, with a concentration of Ni, Mn and Co of 0.72 mol/L, 0.55 mol/L and 0.63 mol/L (Ni:Mn:Co=38:29:33), respectively. A NaOH solution of 400 g/L and an ammonia solution with the concentration of 227 g/L are used as precipitation agent and chelating agent, respectively. The feed solution, NaOH solution and ammonia solution are continuously pumped into a 10 L CSTR reactor set at a precipitation temperature of 60° C., with an impeller stirring speed of 1000 rpm. The flow rates of the metals solution, NaOH solution and ammonia solutions are calculated by the molar ratio of OH/M, $NH_3$/M and residence time. The molar ratio of OH/M is fixed at 2.12 and the $NH_3$/M molar ratio is set at 0.9.

The hydroxide precursor slurry is collected through the overflow of the reactor. The obtained precursor slurry is subjected to a solid-liquid separation over a press filter, and the solids are washed with deionized water for several times until the conductivity of the filtered water is lower than 50 μS/m. Then, the cake is dried at 150° C. for 24 hrs. After drying, the obtained PZX7 hydroxide precursor is blended with $Li_2CO_3$ with a Li:M molar ratio of 1.10—assuming that $Li_2CO_3$ has a purity of 97%. 1 kg of this blend is slowly heated to 970° C. in a flow of air of 10 L/kg.min, and the sintering is continued for 10 hrs. After cooling, the sample is sieved and called ZX 7. Coin cells are prepared as described in the text. The results of the electrochemical tests of ZX 7 are given in Table 4.

COUNTER EXAMPLE 4

The CZX7 precursor from Example 1 is blended with $Li_2CO_3$ with a Li:M molar ratio of 1.10—assuming that $Li_2CO_3$ has a purity of 97%. 1 kg of this blend is slowly heated to 970° C. in a flow of air of 10 L/kg.min, and the sintering is continued for 10 hrs. After cooling, the sample is sieved and labelled ZX-C 7. Coin cells are prepared as described in the text. The results of the electrochemical tests of ZX-C 7 are given in Table 4.

COUNTER EXAMPLE 5

The CZX12 precursor from Example 2 is blended with $Li_2CO_3$ with a Li:M molar ratio of 1.10—assuming that $Li_2CO_3$ has a purity of 97%. 1 kg of this blend is slowly heated to 970° C. in a flow of air of 10 L/kg.min, and the sintering is continued for 10 hrs. After cooling, the sample is sieved and called ZX-C 12. Coin cells are prepared as described in the text. The results of the electrochemical tests of ZX-C 12 are given in Table 4.

TABLE 4

Coin cell performance comparison between the NMC cathode materials produced from carbonate precursor and ion exchanged precursor.

| Cathode product Info | | | Specific capacity | | | Rate performance (per 0.1 C) | | |
|---|---|---|---|---|---|---|---|---|
| NMC cathode | Precursor | D50 (μm) | 1st DQ (mAh/g) | 1st CE (%) | CV-DV (mV) | 1 C (%) | 2 C (%) | 3 C (%) |
| ZX-P 7 | PCZX 7 | 8.4 | 166.6 | 93.28 | 15.35 | 94.10 | 91.56 | 89.82 |
| ZX-P 12 | PCZX 12 | 12.2 | 165.1 | 92.86 | 13.70 | 93.83 | 91.16 | 89.40 |
| ZX 7 | PZX 7 | 6.8 | 160.6 | 89.44 | 40.0 | 93.17 | 90.22 | 88.01 |
| ZX-C 7 | CZX 7 | 7.1 | 158.1 | 90.47 | 26.60 | 92.76 | 89.33 | 86.72 |
| ZX-C 12 | CZX 12 | 12.0 | 158.0 | 89.59 | 28.65 | 91.94 | 88.28 | 85.50 |

A summary of the precursor and cathode materials in the examples is given in Table 5. The conclusion of Tables 4 & 5 is:

- the BET value is very high for a) carbonate based precursors, b) hydroxide based precursors prepared via ion-exchange of carbonate based precursors and c) cathode material prepared from each of these;
- the BET value of a typical hydroxide precursor and of the cathode material prepared from this typical hydroxide precursor is very low;
- by taking ZX 7, the prior art cathode material prepared from a traditional hydroxide precursor, as a reference, it shows that cathode materials prepared directly from carbonate based precursors have mostly lower specific capacity and rate performance values;
- the cathode material prepared from the ion-exchanged hydroxide based precursors have superior specific capacity and rate performance values.

TABLE 5

Summary of the precursor and cathode materials described in this invention and their BET values.

| Product Name | Particle size (D50, μm) | Product Description | BET (m²/g) |
|---|---|---|---|
| CZX 7 | 6.9 | $Ni_{0.38}Mn_{0.29}Co_{0.33}$ carbonate precursor | 65.2 |
| PCZX 7 | 8.2 | $Ni_{0.38}Mn_{0.29}Co_{0.33}(O)_x(OH)_{2-x-y}(CO_3)_y$ precursor produced from carbonate after ion-exchange | 51.7 |
| ZX-P 7 | 8.4 | Li $Ni_{0.38}Mn_{0.29}Co_{0.33}O_2$ cathode material produced by calcination of Li salt and PCZX 7 precursor | 1.19 |
| ZX-C 7 | 7.1 | Li $Ni_{0.38}Mn_{0.29}Co_{0.33}O_2$ cathode material produced by calcination of Li salt and CZX 7 precursor | 1.26 |
| PZX 7 | 7.2 | $Ni_{0.38}Mn_{0.29}Co_{0.33}(O)_x(OH)_{2-x-y}(CO_3)_y$ precursor produced from a typical hydroxide precipitation | 2.51 |
| ZX 7 | 7.4 | Li $Ni_{0.38}Mn_{0.29}Co_{0.33}O_2$ cathode material produced by calcination of Li salt and PZX 7 precursor | 0.24 |
| CZX 12 | 11.8 | $Ni_{0.38}Mn_{0.29}Co_{0.33}$ carbonate precursor | 92.0 |
| PCZX 12 | 12.1 | $Ni_{0.38}Mn_{0.29}Co_{0.33}(O)_x(OH)_{2-x-y}(CO_3)_y$ precursor produced from carbonate after ion-exchange | 55.7 |
| ZX-P 12 | 12.2 | Li $Ni_{0.38}Mn_{0.29}Co_{0.33}O_2$ cathode material produced by calcination of Li salt and PCZX 12 precursor | 1.21 |
| ZX-C 12 | 12.0 | Li $Ni_{0.38}Mn_{0.29}Co_{0.33}O_2$ cathode material produced by calcination of Li salt and CZX 12 precursor | 1.30 |

The invention claimed is:

1. A crystalline precursor compound for manufacturing a lithium transition metal based oxide powder usable as an active positive electrode material in lithium-ion batteries, the precursor having a general formula $M(O)_x(OH)_{2-x-y}(CO_3)_y$, with $0 \leq x \leq 1$, $0 < y \leq 0.03$ and $M=Ni_aMn_bCo_cA_d$, A being a dopant, with $0.30 \leq a \leq 0.90$, $0.10 \leq b \leq 0.40$, $0.10 \leq c \leq 0.40$, $d \leq 0.05$ and $a+b+c+d=1$, the precursor having a Na content less than 200 ppm, a S content less than 250 ppm, the precursor having a specific surface area with a BET value expressed in m²/g and a tap density TD expressed in g/cm³, with a ratio $BET/TD \geq 30.10^4$ cm⁵/g².

2. The crystalline precursor compound of claim 1, having a tap density $TD \geq 1.0$ g/cm³.

3. The crystalline precursor compound of claim 1, having a BET value $\geq 35$ m²/g.

4. The crystalline precursor compound of claim 1, having a Na content less than 100 ppm, a S content less than 200 ppm, and the sum of the Na and the S content being less than 300 ppm.

5. The crystalline precursor compound of claim 1, having a BET value $\geq 45$ m²/g.

6. The crystalline precursor compound of claim 1, having a tap density $TD \geq 1.2$ g/cm³.

7. The crystalline precursor compound of claim 1, having a median particle size (D50) between 5-25 μm.

8. The crystalline precursor compound of claim 1, having a carbon content $\leq 0.15$ wt %.

9. A method for preparing the crystalline precursor compound according to claim 1, the method comprising the steps of:
   providing a $MSO_4$ sulfate feed solution comprising Ni—, Mn—, Co— and A-ions,
   providing an ionic solution comprising one or both of a carbonate and a bicarbonate solution, the ionic solution further comprising one or both of Na— and K-ions,
   mixing the sulfate feed solution and the ionic solution in a reactor with a $CO_3/M$ molar ratio $\geq 1.0$, thereby precipitating a M-carbonate intermediate product, and
   dispersing the M-carbonate intermediate product in a NaOH solution at a temperature between 70 and 95° C. with a OH/M molar ratio $\geq 2.0$, thereby precipitating a crystalline precursor.

10. The method according to claim 9, wherein the OH/M molar ratio is between 2.0 and 2.1.

11. The method according to claim 9, wherein the molar ratio $CO_3/M \geq 1.05$.

12. The method according to claim 9, further comprising the additional steps of:
   filtering and washing the precursor until the conductivity of the filtrate reaches at most 50 μS/cm, and
   drying the filtered and washed precursor at a temperature between 120 and 160° C. for 12-36 hrs. in an air atmosphere.

13. The method according to claim 9, wherein the $MSO_4$ sulfate feed solution has a molar content $M_{feed}$, and the method further comprises
   in addition to the $MSO_4$ sulfate feed and the ionic solution, providing a slurry comprising seeds comprising M'-ions and having a molar metal content $M'_{seeds}$, wherein $M'=Ni_{x'}Mn_{y'}Co_{z'}A'_{n'}$, A' being a dopant, with $0 \leq x' \leq 1$, $0 \leq y' \leq 1$, $0 \leq z' \leq 1$, $0 \leq n' \leq 1$ and $x'+y'+z'+n'=1$,
   mixing the sulfate feed solution, the ionic solution and the slurry in a reactor with a $CO_3/M$ molar ratio $\geq 1.0$ and a molar ratio $M'_{seeds}/M_{feed}$ between 0.001 and 0.1, thereby precipitating the M-carbonate intermediate product on the seeds, and
   dispersing the M-carbonate intermediate product precipitated on the seeds in the NaOH solution.

14. The method according to claim 13, wherein M=M'.

15. The method according to claim 13, wherein the seeds have a median particle size D50 between 0.1 and 3 μm, and wherein the M'-ions are present in a water insoluble compound that is one of $M'CO_3$, $M'(OH)_2$, M'-oxide or M'OOH.

* * * * *